No. 819,161. PATENTED MAY 1, 1906.
B. NEWMAN.
JIM CROW, &c., FOR BENDING RAILS.
APPLICATION FILED JAN. 19, 1906.
2 SHEETS—SHEET 1.
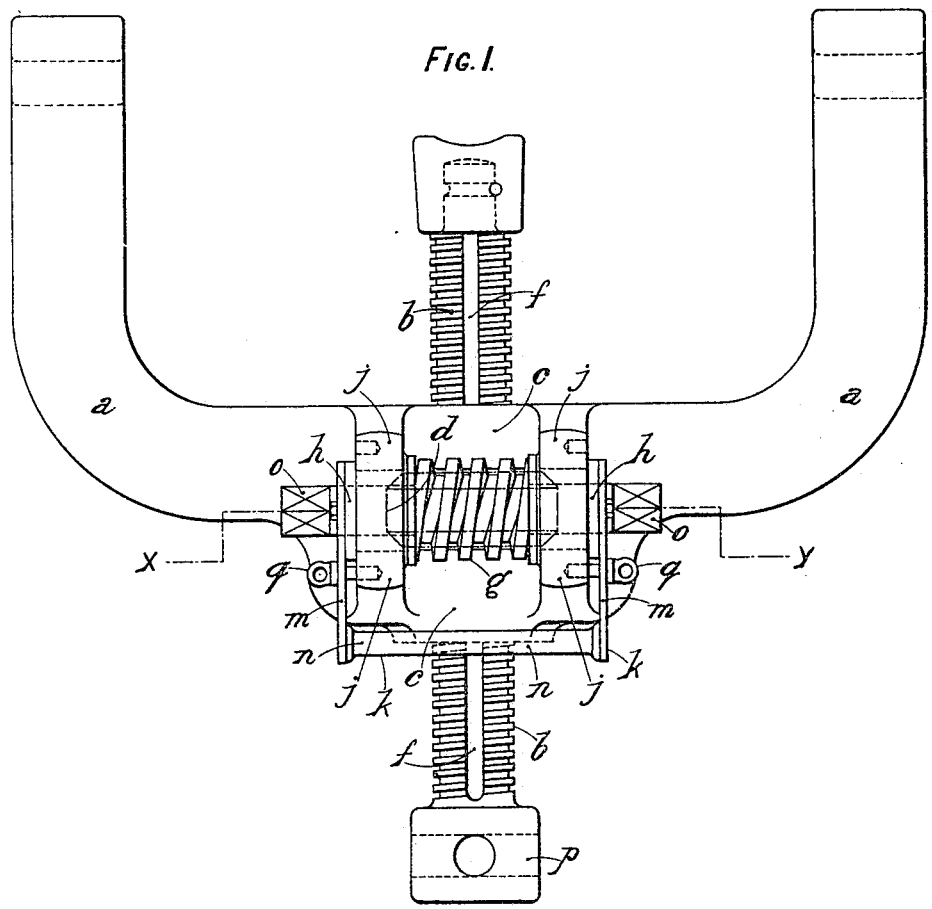

No. 819,161. PATENTED MAY 1, 1906.
B. NEWMAN.
JIM CROW, &c., FOR BENDING RAILS.
APPLICATION FILED JAN. 19, 1906.

2 SHEETS—SHEET 2.

WITNESSES:
Fred White
Rene' Bruine

INVENTOR:
Benjamin Newman,
By his Attorneys
Arthur C. Fraser Usina

UNITED STATES PATENT OFFICE.

BENJAMIN NEWMAN, OF GATESHEAD, ENGLAND.

JIM-CROW, &c., FOR BENDING RAILS.

No. 819,161.     Specification of Letters Patent.     Patented May 1, 1906.

Application filed January 19, 1906. Serial No. 296,798.

*To all whom it may concern:*

Be it known that I, BENJAMIN NEWMAN, a subject of the King of Great Britain and Ireland, and a resident of Gateshead, in the county of Durham, England, have invented certain new and useful Improvements in or Relating to Jim-Crows and Similar Appliances for Bending and Straightening Rails, Tubes, and the Like, of which the following is a specification.

This invention relates to "jim-crows" and similar appliances for bending and straightening rails, tubes, and the like.

At present in jim-crows and similar appliances the necessary pressure for bending or straightening the rail or other object is obtained by a screwed rod or shaft, one end of which bears or presses against the object, while the other end is directly rotated by a crowbar, lever, handle, or the like. When a railway-rail or other object having a comparatively large cross-sectional area is being acted upon, considerable power is required to operate the screwed rod or shaft; and the object of this invention is to provide means whereby the screwed rod or shaft can be rotated to exert the necessary pressure in a simple and efficient manner and by less manual power than at present. To this end and according to my invention the screwed rod or shaft is operated through worm or like gearing, which, however, is adapted to be disengaged when desired to permit of the rod or shaft being operated directly, as usual, or otherwise conveniently when it is required to travel the rod or shaft through a comparatively large distance—such as, for instance, when bringing the end that exerts the pressure up to its work or when releasing the object operated on.

I will fully describe one form of apparatus made in accordance with my invention and adapted for use as a jim-crow or rail-bender with reference to the accompanying drawings, wherein—

Figure 1 is a plan; Fig. 2, a section on the line X Y in Fig. 1, and Fig. 3 a sectional end view of Fig. 1. Fig. 4 is an end view of a slightly-modified arrangement.

Figure 3:
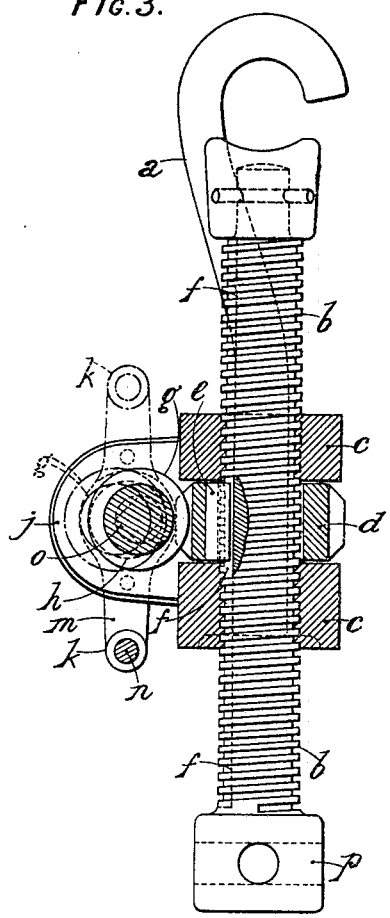
Figure 4:
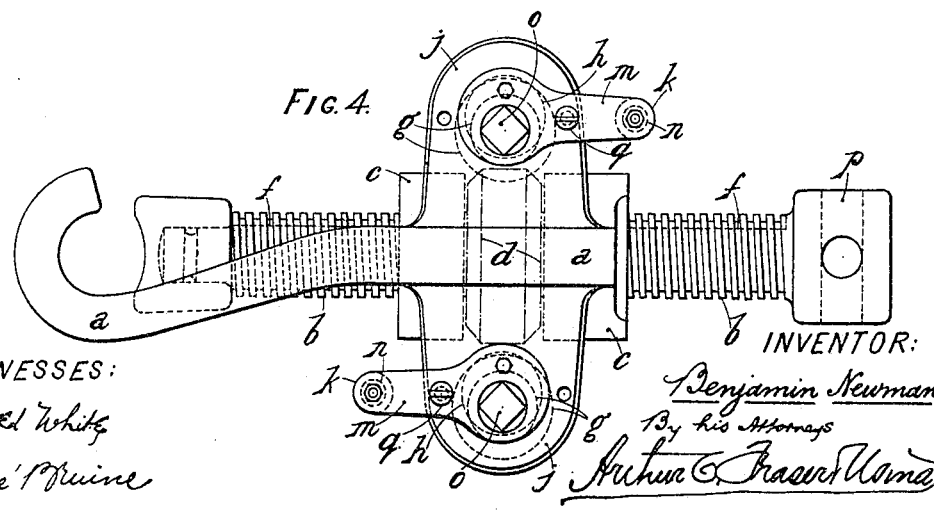

Referring first, to Figs. 1 to 3, in this form of my invention I employ a U-shaped frame $a$, the arms of which are shaped to engage the rail, as usual, and a screwed rod or shaft $b$, passing through a divided screwed boss $c$ on the frame $a$. On the screwed rod or shaft $b$ and within or between the divided boss $c$ is disposed a worm or like wheel $d$, through which the rod or shaft $b$ is free to slide; but the worm or like wheel $d$ is provided with a feather or key $e$, Figs. 2 and 3, adapted to coact with a keyway $f$ in the rod or shaft $b$, so that these two parts revolve together. The worm or like wheel $d$ is operated by a worm or the like $g$, eccentrically mounted in bearing blocks or bushes $h\ h$ in brackets or lugs $j\ j$, provided on the frame $a$, said bearing blocks or bushes $h\ h$ being adapted to be turned in the brackets or lugs $j\ j$ to move the worm or the like $g$ into and out of engagement with the worm or like wheel $d$ by a handle $k$, comprised by side arms $m\ m$ and a connecting member $n$ or by other suitable means. Normally the worm or the like $g$ is in engagement with the worm or like wheel $d$, as shown in Figs. 1, 2, and 3, and the screwed rod or shaft $b$ is operated by ratchet-levers or the like engaging one or both ends $o\ o$ or the worm or like spindle; but when it is required to travel the screwed rod or shaft $b$ a comparatively large distance the worm or the like $g$ can be eccentrically turned in the brackets $j\ j$ aforesaid by the handle $k$ until it is clear of the worm or like wheel $d$, as shown in dot-and-dash lines in Fig. 3, to allow of the screwed rod or shaft $b$ being operated directly by a crowbar or the like engaging its outer end $p$, as usual. The worm or the like $g$ is adapted to be locked in its engaging and disengaging positions by pins $q\ q$ passing through holes in the arms $m\ m$ of the handle $k$ and into holes in the brackets $j\ j$ or otherwise suitably locked. In some cases a worm or the like, such as $g$, may be provided on each side or face of the frame $a$, as shown in Fig. 4, so that the apparatus may be readily used with either side or face uppermost.

What I claim, and desire to secure by Letters Patent, is—

1. An appliance for bending and straightening rails, tubes and the like comprising the combination of a U-shaped frame, arms on said frame, said arms being adapted to engage the rail, a screwed boss on said frame, a screwed rod passing through said boss and coacting therewith, gearing through which said screwed rod is normally operated and means for disengaging said gearing from the screwed rod, substantially as described.

2. An appliance for bending and straightening rails, tubes and the like comprising the combination of a U-shaped frame, arms on said frame, said arms being adapted to engage the rail, a screwed boss on said frame, a screwed rod passing through said boss and coacting therewith, a keyway in said screwed rod, a worm-wheel disposed around said screwed rod and connected thereto by a key adapted to slide in said keyway, a worm adapted to coact with said worm-wheel, and means for operating said worm, substantially as described.

3. An appliance for bending and straightening rails, tubes and the like comprising the combination of a U-shaped frame, arms on said frame, said arms being adapted to engage the rail, a screwed boss on said frame, a screwed rod passing through said boss and coacting therewith, a keyway in said screwed rod, a worm-wheel disposed around said screwed rod and connected thereto by a key adapted to slide in said keyway, bearings in said frame, bearing-blocks disposed in said bearings, a worm eccentrically mounted on said bearing-blocks, means for operating said worm, and means for locking said bearings in position, substantially as described.

4. An appliance for bending and straightening rails, tubes and the like comprising the combination of a U-shaped frame, arms on said frame, said arms being adapted to engage the rail, a screwed boss on said frame, a screwed rod passing through said boss and coacting therewith, a keyway in said screwed rod, a worm-wheel disposed around said screwed rod and connected thereto by a key adapted to slide in said keyway, two sets of bearings in said frame, two sets of bearing-blocks in said bearings, a worm eccentrically mounted on each set of bearing-blocks, means for operating said worms, and means for locking each of said sets of bearings in position, substantially as described.

In witness whereof I have hereunto signed my name in the presence of two subscribing witnesses.

BENJAMIN NEWMAN.

Witnesses:
EDMUND WARD PATTISON,
HERBERT HOWARD.